United States Patent
Huang (10) Patent No.: US 7,708,481 B2
(45) Date of Patent: May 4, 2010

(54) SELECTABLE LENS MECHANISM AND CAMERA HAVING SAME

(75) Inventor: Shih-Hsin Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 11/847,282

(22) Filed: Aug. 29, 2007

(65) Prior Publication Data

US 2008/0226286 A1    Sep. 18, 2008

(30) Foreign Application Priority Data

Mar. 16, 2007    (CN) .......................... 2007 1 0200296

(51) Int. Cl.
*G03B 17/00* (2006.01)
(52) U.S. Cl. .......................... 396/529; 396/74
(58) Field of Classification Search ................ 396/529
See application file for complete search history.

(56) References Cited

U.S. PATENT DOCUMENTS

| | | | | |
|---|---|---|---|---|
| 3,573,367 A | * | 4/1971 | LaRue, Jr. | 348/357 |
| 3,631,774 A | * | 1/1972 | Tidd | 396/559 |
| 3,693,516 A | * | 9/1972 | Aron et al. | 396/554 |
| 3,772,977 A | * | 11/1973 | Guccione | 396/336 |
| 4,140,381 A | * | 2/1979 | Douglas | 396/323 |
| 4,403,843 A | * | 9/1983 | Maitani et al. | 396/110 |
| 5,617,260 A | * | 4/1997 | McNiven et al. | 359/821 |
| 6,339,680 B1 | * | 1/2002 | Mauvais | 396/6 |
| 6,754,008 B1 | * | 6/2004 | Wallerstein et al. | 359/672 |

FOREIGN PATENT DOCUMENTS

| | | |
|---|---|---|
| CN | 2127184 Y | 2/1993 |
| CN | 2303318 Y | 1/1999 |
| CN | 2653548 Y | 11/2004 |

* cited by examiner

*Primary Examiner*—Rodney E Fuller
(74) *Attorney, Agent, or Firm*—Zhigang Ma (57) ABSTRACT

A camera includes a housing, a camera lens and a supplemental lens mechanism positioned on the housing and located in front of the camera lens. The supplemental lens mechanism includes a supplemental lens set, a carousel, a holder, a bracket, and a positioning ring. The supplemental lens set includes a number of supplemental lenses configured for producing different imaging effects. The carousel is disposed in front of the camera lens. The holder joins with the carousel to hold the supplemental lens set. The bracket is disposed in the housing of the camera and accommodates/carries the carousel. The positioning ring couples to the bracket to hold the carousel. The carousel can rotate in the bracket to make a selectable one of the supplemental lenses in the supplemental lens set align with the camera lens.

17 Claims, 7 Drawing Sheets

SELECTABLE LENS MECHANISM AND CAMERA HAVING SAME

TECHNICAL FIELD

The present invention relates to supplemental lens mechanisms (including lens protection mechanisms) and cameras with the same, and, particularly, to a supplemental lens mechanism with a selectable lens feature and a camera having the same.

BACKGROUND

In recent years, cameras and image recorders have become popular with consumers. The camera lens, as a key component to traditional or digital cameras, plays an important role in the image quality.

Early digital cameras seldom had a protection mechanism in front of the camera lens. Camera lenses might suffer from pollution from dust or other pollutants if exposed to the environment without protection. Recently, some digital cameras have provided a protective cover in front of the camera lens. The protective cover moves to expose the camera lens when the digital camera is switched on. The protective cover moves to protect the camera lens when the digital camera is switched off. However, the protective cover lacks any other function.

Therefore, it is desired to develop a lens protection mechanism, which is capable of protecting the camera lens and is further capable of facilitating imaging diversity for the camera and a camera having the same.

SUMMARY

In accordance with a present embodiment, a camera includes a housing, a camera lens, and a supplemental lens mechanism positioned on the housing and in front of the camera lens. The supplemental lens mechanism includes a lens set, a carousel, a holder, a bracket, and a positioning ring. The lens set includes a number of supplemental lenses configured (i.e., structured and arranged), as a whole, for both protecting the camera lens and producing different imaging effects (e.g., focusing, filtering, diffracting, diffusing, etc.). The carousel is disposed and mounted in front of the camera lens. The holder couples to the carousel for holding the lens set. The bracket is disposed in the housing of the camera and accommodates/carries the carousel. The positioning ring couples to the bracket and is configured for constraining the carousel. The carousel can rotate in the bracket to make one of the supplemental lenses in the lens set align with the camera lens.

Other advantages and novel features will be drawn from the following detailed description of at least one preferred embodiment, when considered in conjunction with the attached drawings.

BRIEF DESCRIPTION OF THE DRAWINGS

Many aspects of the present lens mechanism can be better understood with reference to the following drawings. The components in the drawings are not necessarily drawn to scale, the emphasis instead being placed upon clearly illustrating the principles of the present lens mechanism. Moreover, in the drawings, like reference numerals designate corresponding parts throughout the several views.

DETAILED DESCRIPTION OF THE PREFERRED EMBODIMENT

Embodiments of the present lens mechanism will now be described in detail below and with reference to the drawings.

Figure 1:
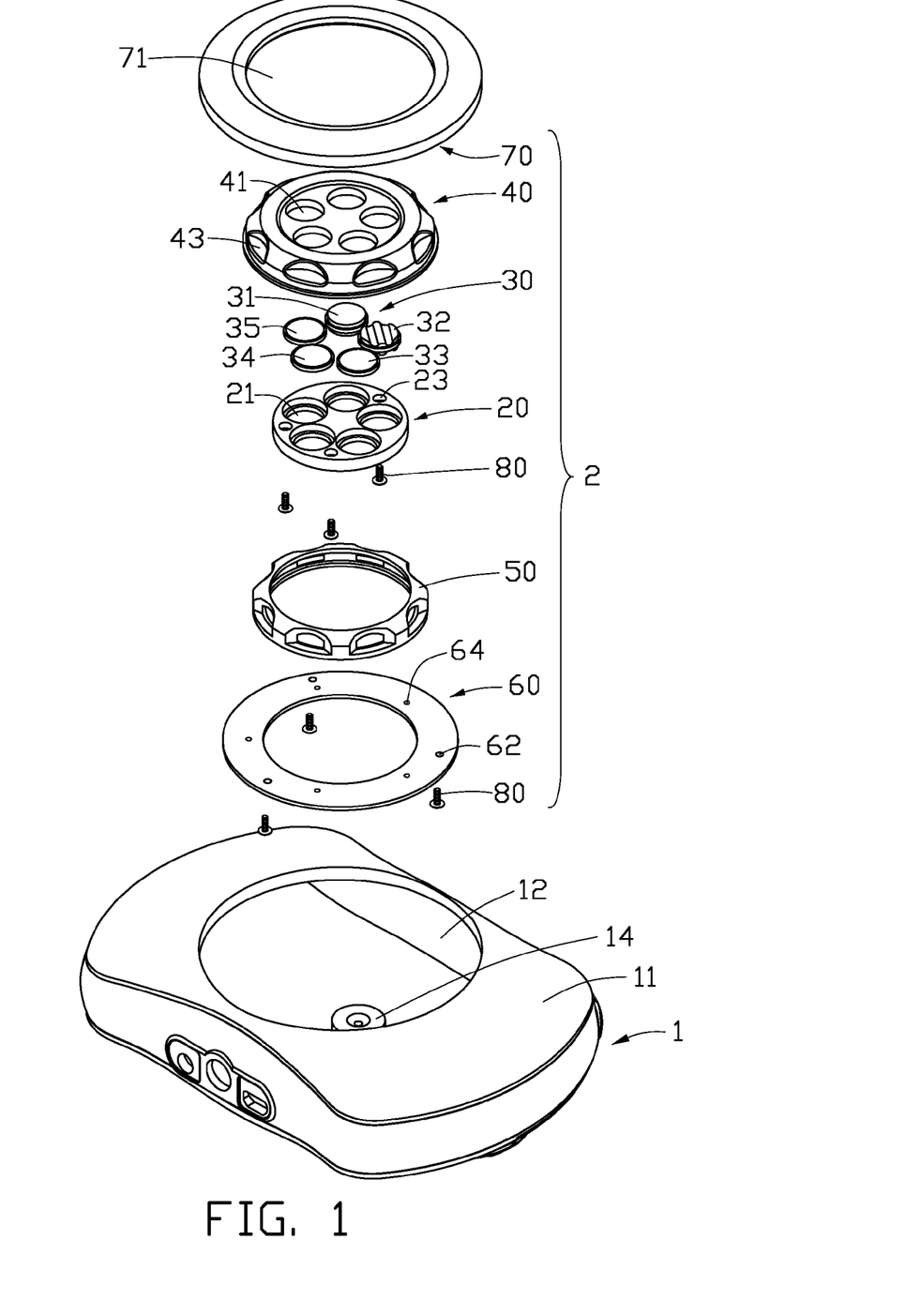
FIG. 1 is an exploded view of a digital camera and a supplemental lens mechanism, according to a first present embodiment.

FIG. 1 illustrates a digital camera 1 and a supplemental lens mechanism 2, in accordance with a first present embodiment. The supplemental lens mechanism 2 is received and mounted in an opening 12 of a housing 11 in the digital camera 1. The supplemental lens mechanism 2 is disposed in front of a camera lens 14. The supplemental lens mechanism 2 includes a holder 20, a lens set 30, a carousel 40, a base 50, a positioning ring 60, a bracket 70, and a plurality of screws 80.

The holder 20 is formed in a disk shape and is configured for loading the supplemental lens set 30. The holder 20 defines five circular holes 21 and three through holes 23. The five circular holes 21 are evenly distributed radially about the holder 20 (i.e., the centers thereof fall at equal angular spacing in a circle centered about the holder axis).

The supplemental lens set 30 includes, in the illustrated embodiment, five lenses capable of producing different imaging effects. For example, the supplemental lens set 30 includes a first lens 31 configured for compound eye imaging, a second lens 32 configured for wave effect imaging, a third lens 33 configured as a concave lens, a fourth lens 34 configured as a convex lens, and a fifth lens 35 configured for normal imaging. Each lens of the supplemental lens set 30 has an essentially identical shape and size, varying only to the degree needed to produce the particular desired imaging effect (e.g., convex instead of concave). Each lens of the supplemental lens set 30 can be considered as having an upper portion, a lower portion, and a middle portion sandwiched therebetween. The diameter of the middle portion of each of the lenses 31, 32, 33, 34 and 35 is bigger than that of the upper and lower portions. The diameter of the upper portion of each is the same as that of the lower portion. In this way, the five lenses 31, 32, 33, 34 and 35 are respectively loaded in the five holes 21 by a fringe of the middle portion thereof.

Figure 3:
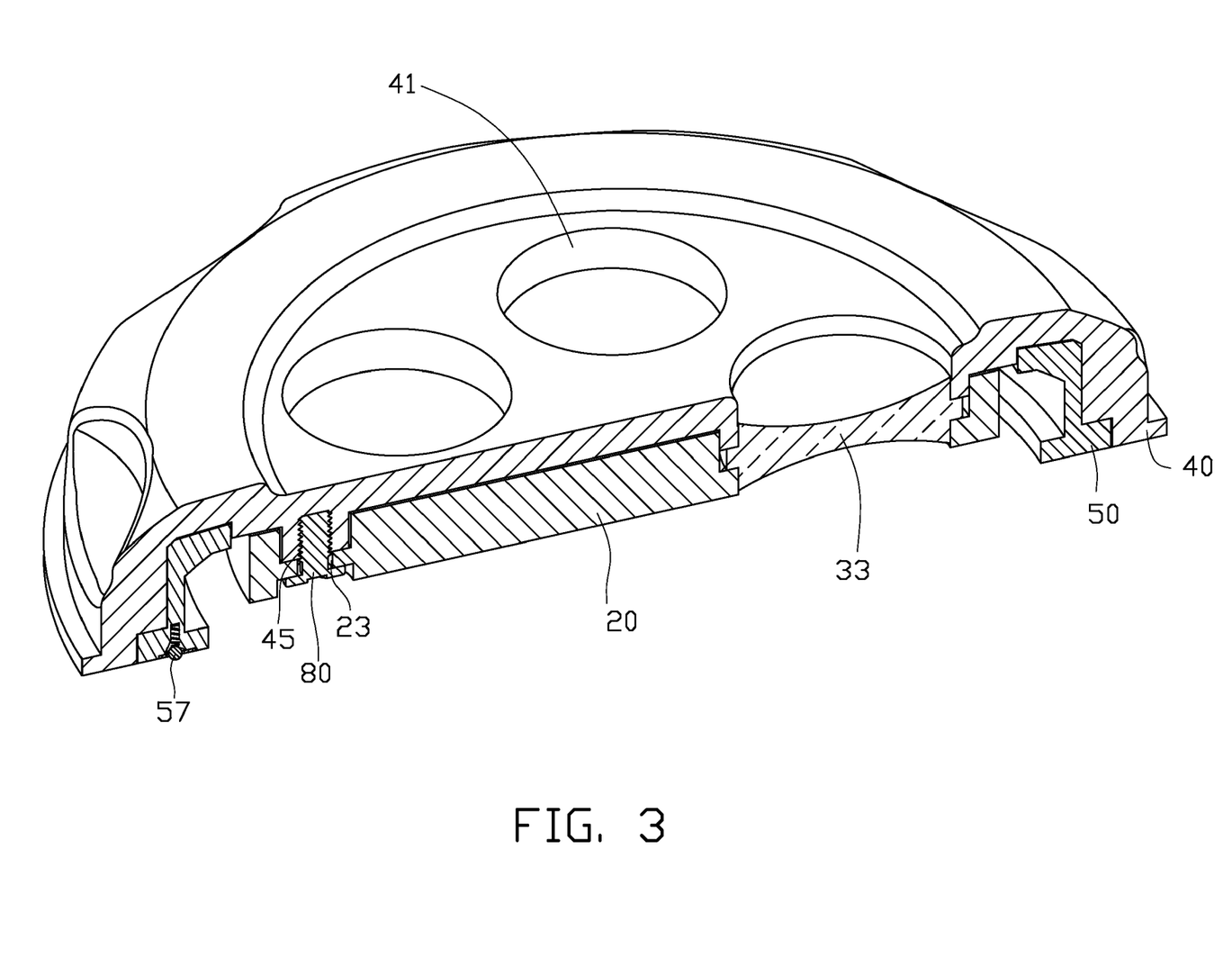
FIG. 3 is a perspective, cross-sectional view of the supplemental lens mechanism, after assembling some components of FIG. 1.

The carousel 40 couples to the holder 20 for holding the supplemental lens set 30. The carousel 40 defines five through holes 41, which correspond to the five holes 21 defined by the holder 20. A number of recesses 43 (usefully arcuate in shape to facilitate easy gripping with fingertips) are formed on the circumference of the carousel 40 to allow operation by hand. The carousel 40 also defines three third screw holes 45, correspondingly aligned with the through holes 23 of the holder 20, as shown in FIG. 3.

Figure 2:
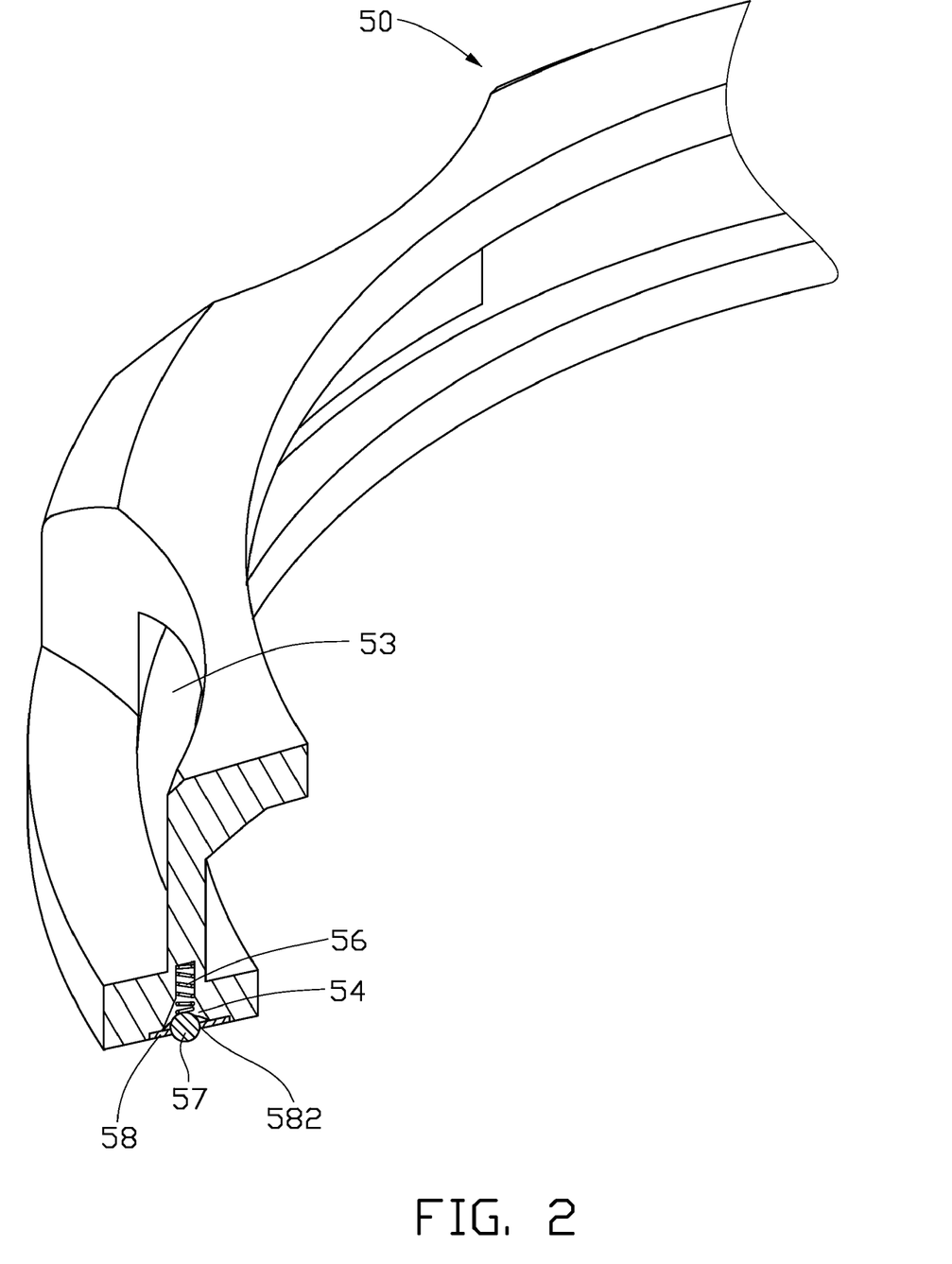
FIG. 2 is an enlarged cut-away view of a base in the supplemental lens mechanism shown in FIG. 1.

The base 50 is a hollow, disk-shaped structure. A number of guiding holes 53, correspondingly aligned with the recesses 43 on the carousel 40, are formed on the circumference of the base 50, as shown in FIG. 2. The base defines a blind hole 54 in a funnel form. A spring 56, a ball 57, and a fixing plate 58 are received, in that general order, inside the blind hole 54.

The fixing plate 58 has a hole 582 in which the ball 57 is pivotably received, and the fixing plate 58 is attached (e.g., via adhesive, welding, mechanical fastener, or other means) to the base 50. The fixing plate 58 constrains the spring 56 and the ball 57 to movement inside the blind hole 54. The hole 582 is smaller than the ball 57 in diameter, such that a portion (i.e., less than half) of the sphere of the ball 57 is revealed outside the fixing plate 58. The spring 56 is in a compressed condition and pushes the ball 57 toward the fixing plate 58. Advantageously, the hole 582 is arcuately-shaped across the thickness of the base 50 (as per the funnel shape mentioned above) so as to essentially match the spherical contour of the contacting portion of the ball 57 (note FIG. 5). Such matching contour facilitates the pivotable movement of the ball 57 within the fixing plate 58.

The positioning ring 60 can be made, beneficially, from a durable plastic or metallic material. The positioning ring 60 defines three first screw holes 62 and forms five positioning recesses 64. The positioning recesses 64 are evenly arranged radially about the positioning ring 60 (i.e., the centers thereof fall at equal angular spacing in a circle centered about the positioning ring axis).

Figure 4:
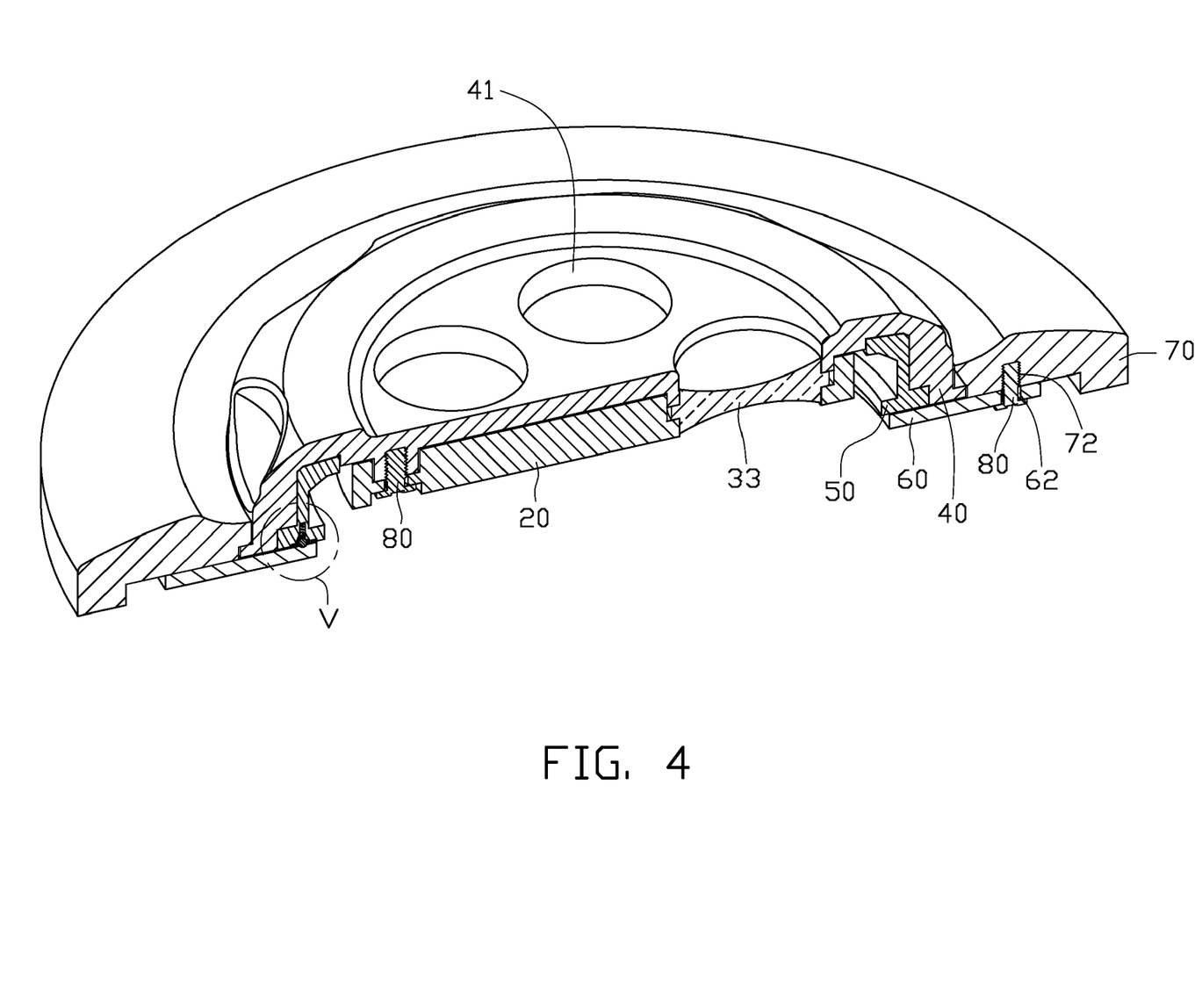
FIG. 4 is a perspective, cross-sectional view of the supplemental lens mechanism of FIG. 1.

The bracket 70 defines an opening 71 configured to allow the carousel 40 to partly extend therethrough. Three second screw holes 72, correspondingly aligning with the first screw holes 62, are evenly defined radially about the bracket 70, as shown in FIG. 4 (i.e., the centers thereof fall at equal angular spacing in a circle centered about the bracket axis).

Referring to FIGS. 3-6, when the digital camera in the first present embodiment is being assembled, the supplemental lenses 31, 32, 33, 34, and 35 are respectively loaded into the five holes 21 of the holder 20 and aligned with the five through holes 41 of the carousel 40. The holder 20 is fixed to the carousel 40 by inserting the screws 80 through the through holes 23 of the holder 20 and the third screw holes 45 of the carousel 40. Accordingly, the supplemental lenses 31, 32, 33, 34, and 35 are fixed in the carousel 40 and the holder 20. The carousel 40 with the holder 20 is firmly affixed to the base 50 by gluing or other means, with the recesses 43 of the carousel 40 matching with the corresponding guiding holes 53 of the base 50 (i.e., the interior arcuate surface of given recess 43 forming a slide fit with a respective exterior arcuate surface of a corresponding guiding hole 53).

Figure 5:
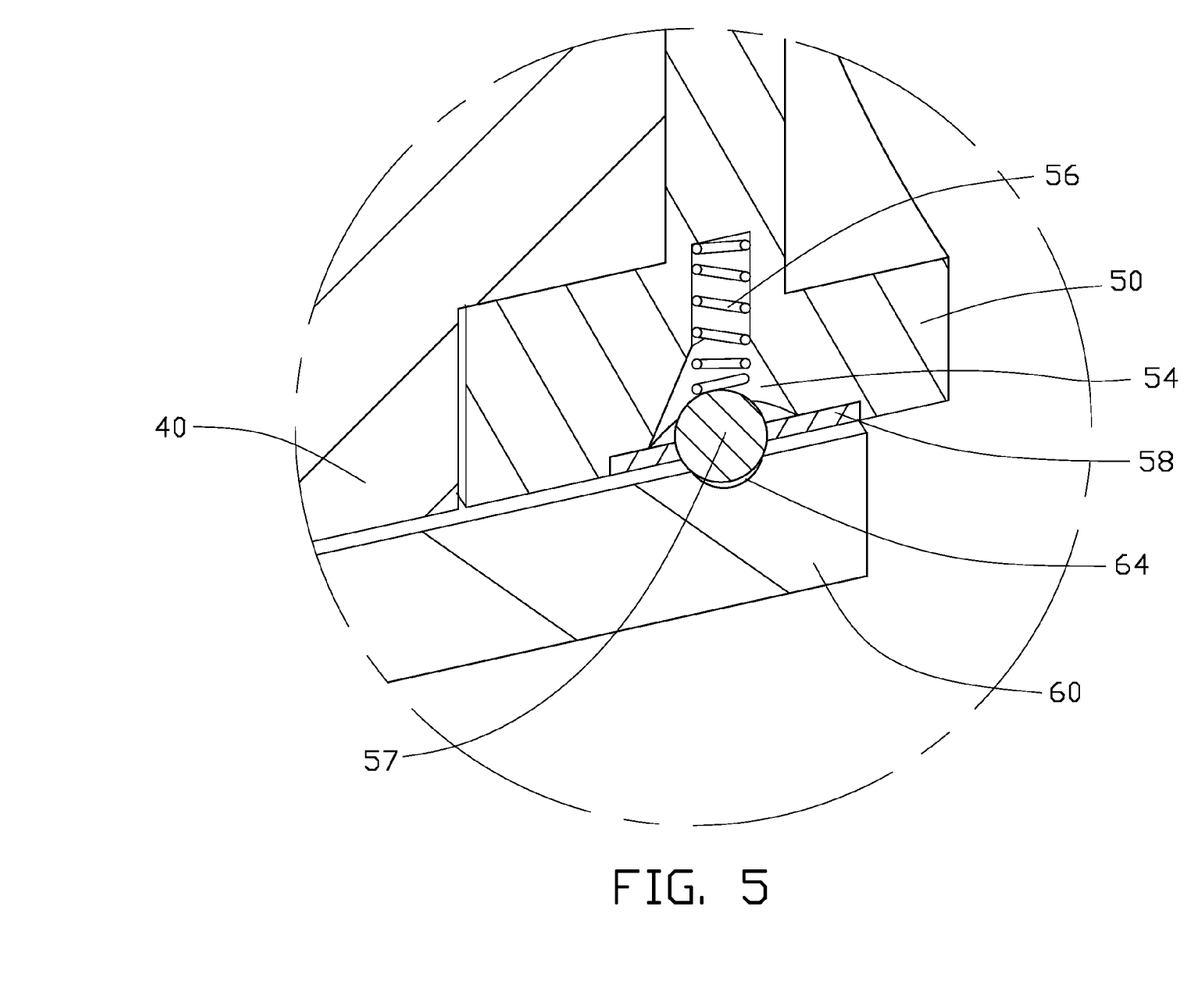
FIG. 5 is an enlarged view of section V in FIG. 4.
Figure 6:
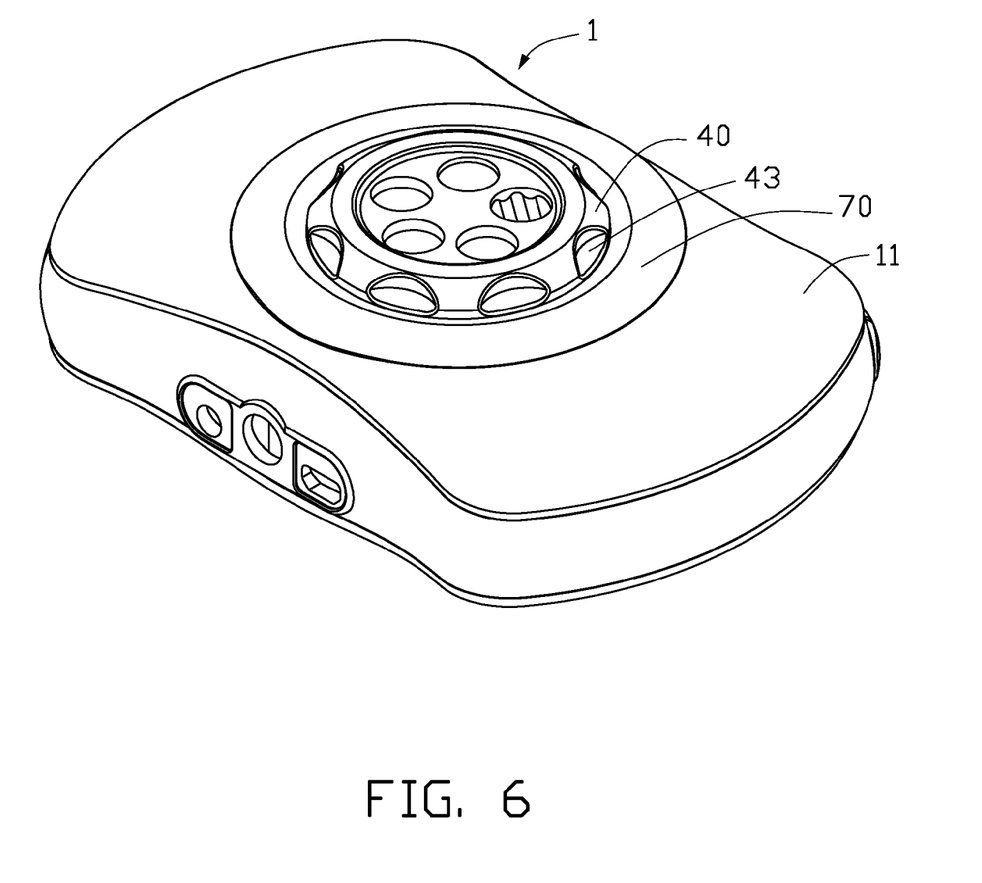
FIG. 6 is an isometric view of the assembled camera of FIG. 1.

Next, the assembled carousel 40 is positioned by inserting the assembled carousel 40 through the opening 71 of the bracket 70. Due to the cross-sectional shape of the opening 71, the outer rim of the carousel 40 is blocked by the bracket 70, thus preventing the assembled carousel from completely extending through the opening 71 of the bracket 70. The first screw holes 62 of the positioning ring 60 are aligned with the second screw holes 72 of the bracket 70. The screws 80 are inserted through the first screw holes 62 and second screw holes 72 to couple the bracket 70 and the positioning ring 60 for holding the assembled carousel 40 in place. A pre-determined gap between the carousel 40 and the bracket 70 allows the carousel 40 to rotate inside the bracket 70 (referring to FIG. 4). When the carousel 40 is rotated, the ball 57 is pushed by the positioning ring 60 and then moves backward to the blind hole 54. As the rotation of the carousel 40 continues, when the ball 57 encounters a given one of the positioning recesses 64 of the positioning ring 60, the ball 57 forced by the compressed spring 56 into contact/engagement with that given recess 64 to effectively hold the carousel 40 in the chosen position (as shown in FIG. 5).

Next, the bracket 70, with the assembled carousel 40, is received in the opening 12 of the housing 11 of the digital camera 1. The bracket 70 is affixed to the housing 11, e.g., by gluing/adhesive, screwing, or any other attachment method. When the assembly of the camera is completed, the user of camera can grip, e.g., the recesses 43 to rotate the carousel 40. If the ball 57 is engaged in a positioning recess 64 at the start of rotation, the ball 57 both rotates and moves upwardly (further compressing the spring 56) in order to reach the main surface of the positioning ring 60. When the ball 57 moves down into engagement with a desired one of the positioning recesses 64, the camera lens 14 of the digital camera 1 is accordingly aligned with a chosen supplemental lens 31, 32, 33, 34, or of the supplemental lens set 30. Of course, the carousel 40 can be rotated until the desired supplemental lens 31, 32, 33, 34, or 35 is held in alignment with the camera lens 14, moving in and out of engagement of positioning recesses 64, as necessary, to finally reach the desired position.

Figure 7:
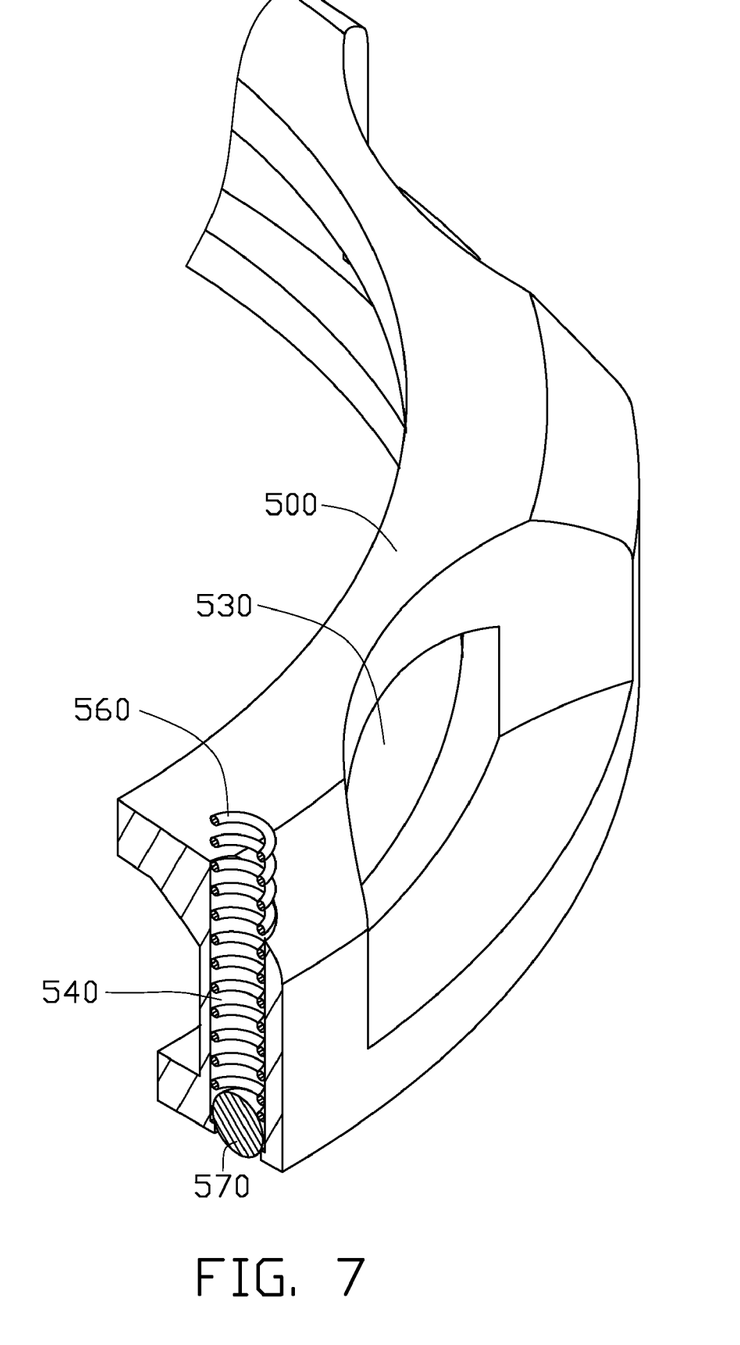
FIG. 7 is an enlarged cut-away view of a carousel and a base of a supplemental lens mechanism in a digital camera, according to a second present embodiment.

FIG. 7 illustrates another lens mechanism in accordance with a second present embodiment. The lens mechanism in the second present embodiment is essentially similar to the first present embodiment, except with respect to the base. The base 500 in the second embodiment forms a plurality of guiding holes 530 corresponding to the recesses 43 of the carousel 40. The base 500 defines a T-shaped hole 540. The T-shaped hole 500 has a main hole diameter and defines an inwardly extending lip/ledge at one distal end thereof. The extending lip/ledge defines a lip/ledge diameter that is less than the main hole diameter. A spring 560 and a ball 570 are received in the hole 540. In particular, the lip/ledge diameter is chosen so to be less than the diameter of the ball 570 in order to help retain the ball 570 within the hole 540. The spring 560 and the hole 540 limit movements of the ball 570 to moving inside the hole 540. A portion of the sphere of the ball is able to protrude beyond the extending lip/ledge of the hole 540. Accordingly, the extending lip/ledge effectively serves the same function as the fixing plate 58 of the first embodiment. The base 500 is affixed to the carousel 40 by, e.g., gluing the guiding holes 530 to the recesses 43. One end of the spring 560 pushes upon the carousel 40 and the other end of the spring 560 pushes the ball 57 toward the extending lip/ledge of the hole 540. The spring 560 is maintained in a compressed condition.

By using the supplemental lens mechanism described in the present embodiments, the camera user can take pictures of different imaging effects by selectably using the different lenses available in the supplemental lens mechanism. The supplemental lens mechanism, by being disposed in front of the primary camera unit, not only protects the camera lens but also provides different imaging effects. The lens mechanism is simple, low-cost, and easy to operate.

It is understandable that the base 50 disclosed in the present embodiments could be omitted and replaced by the carousel 40. In other words, the carousel 40 could define a blind hole in a funnel form. A spring 56, a ball 57, and a fixing plate 58 having a hole 582 would be received in the blind hole. The fixing plate 58 would constrain the spring 56 and the ball 57 to movement in the blind hole. In this case, the carousel 40 could perform the function of the base 50, and thus the base 50 could be omitted.

Except for the lenses mentioned above, the supplemental lens set could include any other lenses of special imaging effects. That is, the lenses, additionally or alternatively to the effects described above, could be used to provide other imaging effects such as filtering, diffusion, diffraction, etc. Further, the number of the lens in the supplemental lens set could be added or decreased accordingly. The supplemental lens mechanism could includes a lens set having two, three, four or even more than five lenses of special imaging effects. Additionally, it is to be understood it could be particularly advantageous to make the supplemental lens mechanism readily removably mounted to a given digital camera, to permit the easy replacement thereof, as needed, and/or to allow for a greater range of supplemental lenses to be employed with a given camera.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A supplemental lens mechanism for use in conjunction with a camera lens of a camera, comprising:
   a supplemental lens set comprising a plurality of supplemental lenses configured for producing different imaging effects;
   a carousel configured for being disposed in front of the camera lens;
   a holder coupled to the carousel, the holder being configured for holding the supplemental lens set;
   a bracket configured for attachment to the camera, the bracket being configured for accommodating the carousel; and
   a positioning ring fixedly coupled to the bracket, the positioning ring being configured for holding the carousel in a manner such that the carousel is capable of rotating in the bracket, so as to allow a chosen supplemental lens to be selectably aligned with the camera lens.

2. The supplemental lens mechanism as claimed in claim 1, wherein the carousel further comprises a base fixed to the carousel.

3. The supplemental lens mechanism as claimed in claim 2, wherein the base defines a hole configured for receiving a spring and a ball therein, and the carousel limits the spring and the ball to movement inside the hole.

4. The supplemental lens mechanism as claimed in claim 3, wherein a portion of the ball protrudes outside the hole.

5. The supplemental lens mechanism as claimed in claim 2, wherein the base defines a blind hole configured for receiving a spring, a ball, and a fixing plate therein, and the fixing plate limits the spring and the ball to movement inside the blind hole.

6. The supplemental lens mechanism as claimed in claim 5, wherein the fixing plate defines an opening through which a portion of the ball is able to protrude out of.

7. The supplemental lens mechanism as claimed in claim 5, wherein a plurality of positioning recesses are defined at a same radial distance about the positioning ring, each positioning recess being configured for selectably positioning the carousel cooperatively with the ball.

8. The supplemental lens mechanism as claimed in claim 7, wherein the number of the positioning recesses is identical to that of the supplemental lenses in the supplemental lens set.

9. The supplemental lens mechanism as claimed in claim 1, wherein a plurality of holes are defined in the holder, the holes receiving the supplemental lens set, a plurality of through holes corresponding to the holes being defined in the carousel.

10. A camera having a housing, a camera lens, and a supplemental lens mechanism, the supplemental lens mechanism comprising:
    a supplemental lens set comprising a plurality of supplemental lenses configured for producing different imaging effects;
    a carousel disposed in front of the camera lens;
    a holder coupled to the carousel and configured for holding the supplemental lens set;
    a bracket fixed to the housing and accommodating the carousel; and
    a positioning ring coupled to the bracket, the positioning ring holding the carousel in a manner such that the carousel is capable of rotating in the bracket so as to make a selectable one of the supplemental lenses align with the camera lens.

11. The camera as claimed in claim 10, wherein the carousel further comprises a base fixed thereto.

12. The camera as claimed in claim 1, wherein the base defines a hole with a T-shaped cross section configured for receiving a spring and a ball therein, the T-shaped cross section of the hole including an inward ledge at a distal end of the hole, and the carousel and the inward ledge together limit the spring and the ball to movement inside the hole.

13. The camera as claimed in claim 12, wherein a portion of the sphere of the ball protrudes outside the hole.

14. The camera as claimed in claim 13, wherein the base defines a blind hole configured for receiving a spring, a ball and a fixing plate, the fixing plate has an opening therein, and the fixing plate limits spring and the ball to movement inside the blind hole.

15. The camera as claimed in claim 14, wherein a portion of the ball protrudes outside the opening.

16. The camera as claimed in claim 14, wherein a plurality of positioning recesses are defined at equal radial distance about the positioning ring, each positioning recess being configured for selectably positioning the carousel cooperatively with the ball.

17. The camera as claimed in claim 16, wherein the number of the positioning recesses is identical to that of the supplemental lenses in the supplemental lens set.

* * * * *